Sept. 10, 1946.    J. A. FORBES    2,407,487
BRAKE
Filed May 29, 1944
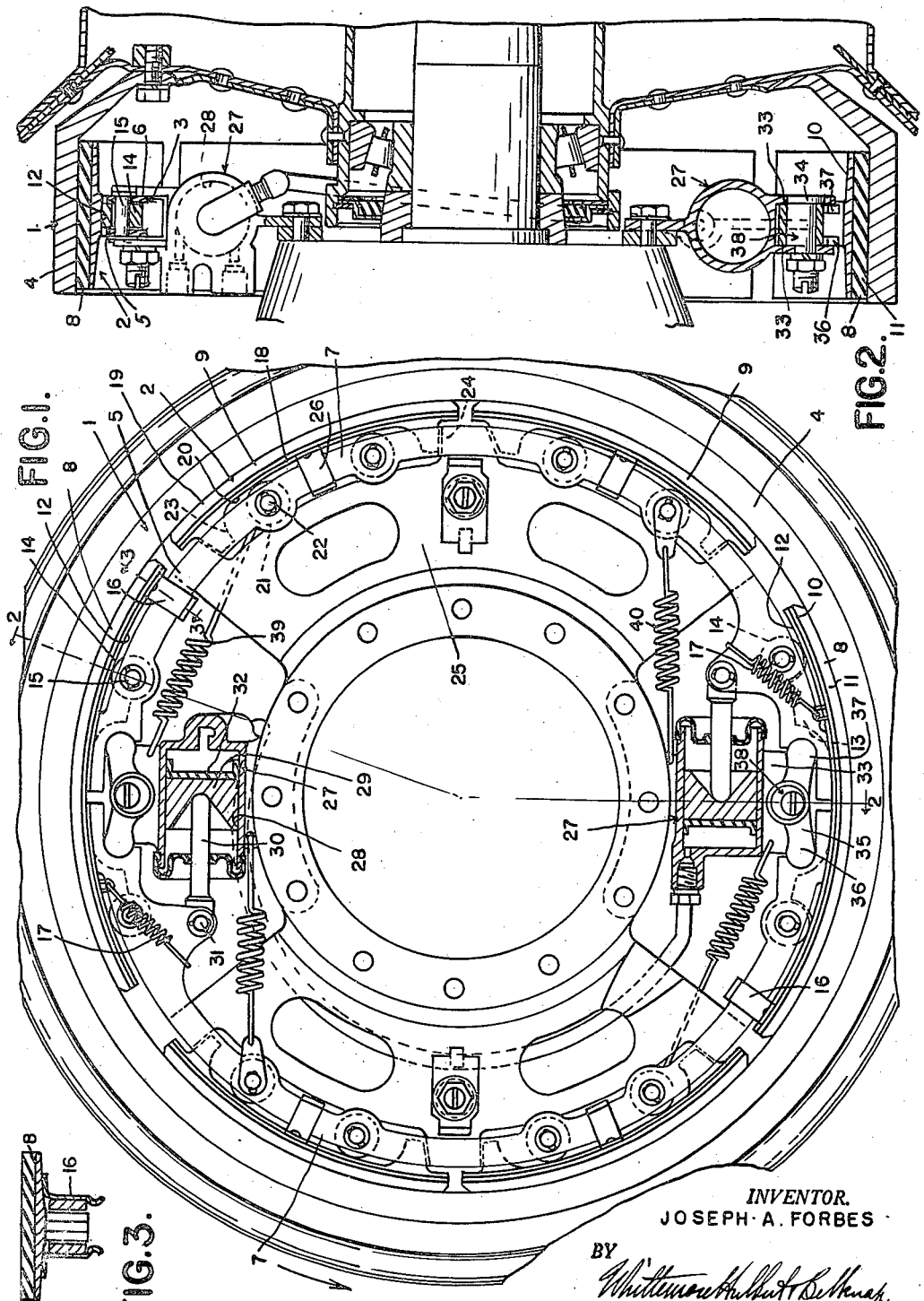
INVENTOR.
JOSEPH A. FORBES
BY
ATTORNEYS Patented Sept. 10, 1946

2,407,487

UNITED STATES PATENT OFFICE 2,407,487

BRAKE

Joseph A. Forbes, Detroit, Mich., assignor to Kelsey-Hayes Wheel Company, Detroit, Mich., a corporation of Delaware Application May 29, 1944, Serial No. 537,850

6 Claims. (Cl. 188—78)

The invention relates to brakes and refers more particularly to brakes of that type in which the torque of a brake member is utilized to increase the braking pressure.

The invention has for one of its objects to provide an improved and powerful brake comprising an expansible device having separable ends and internal brake members movable by the device with one brake member bridging the ends and operatively connected to the device so that its torque may be utilized to increase the braking pressure.

The invention has for another object to provide a brake in which the brake members are movable by a plurality of actuators and are equally effective in either direction of rotation of the drum.

With these as well as other objects in view, the invention resides in the novel features of construction and combinations and arrangements of parts as more fully hereinafter set forth.

In the drawing:

Figure 1 is an elevation, with parts broken away and in section, of a brake embodying the invention;

Figure 2 is a cross section on the line 2—2 of Figure 1;

Figure 3 is a cross section on the line 3—3 of Figure 1.

The brake comprises the brake drum 1, the internal brake members 2 and the expansible thrust device 3. The brake drum is adapted to be secured to a wheel of an airplane, motor vehicle, or the like, and has the annular brake flange 4 against which the brake members are movable by the expansible device. The brake members 2 are arranged in end to end relation and are engageable with the same portion of the annular brake flange. The expansible thrust device is formed of the two members 5 and 6 which are axially spaced from and extend substantially parallel to and are co-extensive with each other. Each annular member is formed of the arcuate members 7 arranged in end to end relation and having spaced ends which are diametrically opposite.

The brake members 2 encircle the annular members 5 and 6 and are arranged so that they comprise diametrically opposite brake members 8 bridging the spaced ends between the arcuate members 7 and the intermediate brake members 9. Each of the diametrically opposite brake members 8 comprises the arcuate body 10 and the brake lining 11, the body having an axial flange to which the lining is secured and a web formed with the arcuate faces 12 and the projections 13 extending radially inwardly beyond the faces. The faces engage the rolls 14 which are journaled on the pins 15 extending transversely through the end portions of the arcuate members 7. The projections 13 preferably have concave faces for fitting adjacent portions of the rolls.

Each of the brake members 8 is preferably secured to the arcuate members 7 to be movable circumferentially thereof and, in the present instance, the securing means comprises the spring clips 16 and the coil spring 17. The spring clips, as shown, are opposed and have foot flanges secured by suitable means, such as rivets, to the axial flange of the arcuate body 10 at one end thereof. The spring clips also have generally radial portions extending generally radially inwardly along the opposite sides of the arcuate members and, further, have transverse flanges at their radially inner edges which extend axially inwardly toward each other and over the radially inner edges of the arcuate members. The coil spring is secured at one end by suitable means, such as an eye, to the axial flange of the arcuate body 10 near the end remote from the spring clips. The coil spring is also secured at the other end to one of the other arcuate members as by being hooked around the radially inner edge thereof. The inclination of the coil spring is such that one of the projections 13 of each brake member 8 is resiliently held against its associated roll 14.

Each of the intermediate brake members 9 comprises the arcuate body 18 and the brake lining 19, the body having an axial flange to which the lining is secured and a web formed with the arcuate face 20 for engaging the rolls 21. The rolls are journaled on the pins 22 which extend transversely through the arcuate members 7. The web is also formed with the projections 23 at the ends of the intermediate brake member and slidably engageable with the projections 24 on the carrier plate 25. The carrier plate is secured by suitable means, such as bolts, to the fixed flange of the support upon which the wheel is journaled in concentric relation to the brake drum 1 and the projections 24 extend generally radially outwardly from the carrier plate in angularly spaced relation and between the annular members 5 and 6 and are located to limit circumferential movement of the intermediate brake members 9, thereby anchoring the same.

The intermediate brake members 9 are preferably secured to the annular members 5 and 6 by the spring clips 26 which are formed in the same manner as the spring clips 16 and are secured to the brake members 9 intermediate their ends.

The carrier plate 25 has fixedly secured thereto the diametrically opposite fluid pressure operated actuators or wheel cylinders 27 each of which comprises the cylinder 28, the piston 29 slidable in the cylinder and the piston rod 30 engaging the piston and pivotally connected to the expansible thrust device 3 at one end thereof by means of the pin 31 which extends transversely through the annular members 5 and 6 and, more particularly, corresponding arcuate members 7. Suitable sealing means, such as the rubber sealing cup 32, is provided at the pressure end of the piston 29. The fluid pressure operated actuators or wheel cylinders are so positioned that their piston rods are pivotally connected diametrically opposite each other to the expansible thrust device. Each cylinder 28 is also formed with the integral radially outwardly extending furcations 33 through which the pin 34 extends. This pin has journaled thereon the bell crank anchor 35 having the integral pairs of spaced arms 36 and 37 formed with rounded or convex ends which engage correspondingly shaped recesses in the end portions of the arcuate members 7. The bell crank anchors are adjustably mounted by means of the rotatively adjustable eccentrics 38 which are journaled in the furcations 33. To hold the ends of the arcuate members 7 against the ends of the arms of the eccentrics, I have provided the coil springs 39 and 40.

Assuming the brake drum 1 to be rotating in the direction of the arrow in Figure 1 and assuming the braking medium to be forced under pressure into the fluid pressure operated actuators or wheel cylinders 27, the adjacent ends of the arcuate members 7 will be relatively moved away from each other by moving the leading ends of the arcuate members. As a result, the rolls 14 and 21 carried by the arcuate members move the brake members 8 and 9 against the brake flange 4 of the brake drum. The circumferential movement of the brake members 9 is limited by the projections 24 of the carrier plate 25. However, the circumferential movement of the brake members 8 is not limited directly by the carrier plate so that they transmit their torque through their projections 13 at their trailing ends to the rolls 14 at the leading ends of the arcuate members 7, thereby increasing the expanding force on the arcuate members and the expansible thrust device of which these arcuate members form a part. It is apparent that the same type of operation would take place if the brake drum were rotating in the opposite direction.

What I claim as my invention is:

1. A brake comprising a brake drum, an expansible device having diametrically opposite separable ends, diametrically opposite anchor means between and engageable with said separable ends, diametrically opposite actuators for relatively moving said separable ends away from each other to expand said device and internal brake members movable by said device against said drum and comprising diametrically opposite brake members bridging said separable ends and operatively connected to said device to transmit their torque when against said drum to said device to increase the expanding force on said device in either direction of rotation of said drum.

2. A brake comprising a brake drum, an expansible device having members with adjacent ends, anchor means between and engageable with said adjacent ends, actuators for relatively moving said adjacent ends away from each other to expand said device and internal brake members movable by said device against said drum and comprising brake members bridging said adjacent ends and operatively connected to said device to transmit their torque when against said drum to said device to increase the expanding force on said device.

3. A brake comprising a brake drum, an expansible device having members arranged in end to end relation and formed with adjacent ends, anchor means between and engageable with said adjacent ends, actuators for relatively moving said adjacent ends away from each other to expand said device, internal brake members encircling and movable by said device against said drum and comprising brake members bridging said adjacent ends and operatively connected to said device to transmit their torque when against said drum to said device to increase the expanding force on said device in either direction of rotation of said drum.

4. A brake comprising a brake drum, an expansible device having separable ends, anchor means between and engageable with said ends, an actuator for relatively moving said ends away from each other to expand said device, and internal brake members movable by said device against said drum and comprising a brake member bridging said ends and operatively connected to said device at said ends to transmit its torque when against said drum to said device to increase the expanding force on said device in either direction of rotation of said drum.

5. A brake comprising a brake drum, internal brake members, means for moving said brake members against said drum comprising an expansible device having separable ends and means for relatively moving said ends away from each other to expand said device, said brake members comprising a brake member bridging said ends and operatively connected to said device to transmit its torque when against said drum to said device in either direction of rotation of said drum to increase the expanding force on said device, anchor means between and engageable with said ends, and means for anchoring certain of said brake members other than said bridging brake member.

6. A brake comprising a brake drum, internal brake members, means for moving said brake members against said drum comprising an expansible device having separable ends and means for relatively moving said ends away from each other to expand said device, said brake members comprising a brake member extending over and bridging said ends and operatively connected to said device to transmit its torque when against said drum to said device in either direction of rotation of said drum to increase the expanding force on said device, means for anchoring certain of said brake members other than said bridging brake member independently of said device and anchor means for said device.

JOSEPH A. FORBES.